(12) United States Patent
Fernandez et al.

(10) Patent No.: US 9,092,772 B2
(45) Date of Patent: Jul. 28, 2015

(54) INTEGRATED SYSTEM AND METHOD FOR ENABLING MOBILE COMMERCE TRANSACTIONS USING "CONTACTLESS IDENTITY MODULES IN MOBILE HANDSETS"

(75) Inventors: Rocky Anthony Fernandez, Mumbai (IN); Sunny Ramaswamy DeWakar, Alexandria, VA (US)

(73) Assignee: Xius Corp., Woburn, MA (US)

( * ) Notice: Subject to any disclaimer, the term of this patent is extended or adjusted under 35 U.S.C. 154(b) by 0 days.

(21) Appl. No.: 12/705,696

(22) Filed: Feb. 15, 2010

(65) Prior Publication Data

US 2010/0216396 A1 Aug. 26, 2010

Related U.S. Application Data

(60) Provisional application No. 61/152,731, filed on Feb. 16, 2009.

(51) Int. Cl.
| | | |
|---|---|---|
| *G06Q 20/00* | (2012.01) | |
| *G06Q 20/32* | (2012.01) | |
| *G06Q 20/10* | (2012.01) | |
| *G06Q 20/20* | (2012.01) | |
| *G06Q 30/06* | (2012.01) | |

(52) U.S. Cl.
CPC .......... *G06Q 20/3278* (2013.01); *G06Q 20/102* (2013.01); *G06Q 20/105* (2013.01); *G06Q 20/202* (2013.01); *G06Q 20/32* (2013.01); *G06Q 20/3223* (2013.01); *G06Q 30/0601* (2013.01)

(58) Field of Classification Search
CPC . G06Q 20/3229; G06Q 20/325; H04B 5/0031
USPC .......... 455/41.1, 41.2, 41.3, 410, 50.1, 556.1, 455/556.2, 90.1–3; 705/14
See application file for complete search history.

(56) References Cited

U.S. PATENT DOCUMENTS

| | | | |
|---|---|---|---|
| 7,155,199 B2* | 12/2006 | Zalewski et al. ............. 455/41.2 |
| 2002/0181710 A1* | 12/2002 | Adam et al. .................. 380/270 |
| 2005/0160003 A1* | 7/2005 | Berardi et al. .................. 705/14 |
| 2006/0165060 A1 | 7/2006 | Dua |
| 2008/0155257 A1 | 6/2008 | Werner et al. |
| 2009/0037284 A1 | 2/2009 | Lewis et al. |
| 2009/0037326 A1 | 2/2009 | Chitti |
| 2009/0088077 A1* | 4/2009 | Brown et al. ................. 455/41.2 |
| 2009/0098825 A1* | 4/2009 | Huomo et al. ............... 455/41.1 |
| 2009/0157512 A1* | 6/2009 | King ................................ 705/14 |
| 2009/0240626 A1* | 9/2009 | Hasson et al. .................. 705/75 |
| 2010/0075666 A1* | 3/2010 | Garner ....................... 455/426.1 |
| 2011/0053560 A1* | 3/2011 | Jain et al. ...................... 455/411 |

* cited by examiner

*Primary Examiner* — Wen Huang
(74) *Attorney, Agent, or Firm* — IPCL Group PLC; Anthony Tacconi, Esq.

(57) ABSTRACT

The invention relates to a smart integration of dual Architecture Contact-less SIM into mobile devices and describes the method of performing various economic transactions more efficiently using a smart and interactive poster device.

17 Claims, 17 Drawing Sheets

INTEGRATED SYSTEM AND METHOD FOR ENABLING MOBILE COMMERCE TRANSACTIONS USING "CONTACTLESS IDENTITY MODULES IN MOBILE HANDSETS"

1. CROSS-REFERENCE TO RELATED APPLICATIONS

This application claims the benefit of U.S. Provisional Application No. 61/152,731, filed on Feb. 16, 2009, which is hereby incorporated by reference in its entirety for all purposes.

2. FIELD OF INVENTION

The Present invention relates to a method, integrated system and active poster for efficient management of mobile touch transaction. More particularly, disclosed is a method, integrated system and active poster for electronic payment systems using portable devices initiating an application and selecting one or more service and carrying out an mobile commerce transaction.

3. DEFINITIONS, ABBREVIATIONS AND ACRONYMS

| Term | Definition |
| --- | --- |
| CL SIM | Dual chip architecture in a 'SIM Card' form factor with an external antenna attached to two unused SIM contacts that works with existing handsets. |
| CL SIM/(U) SIM/R-UIM | one of the embodiments of the invention refers to a) SIM - 2G/2.5 GSM/GPRS/EDGE networks b) (U) SIM- 3G WCDMA c) R-UIM - CDMA 1x/1RTT & CDMA EV-DO. |
| Active Poster | A 'touch-n-display unit' that enables mobile subscribers with CL SIMs in (AP) their handsets to conduct mobile transactions like prepaid recharge, bill payment, etc. |
| Active Poster-Lite (AP Lite) | A stripped down, low cost version of the Active Poster without network connectivity |

| Acronym | Meaning |
| --- | --- |
| AP | Active Poster |
| APBX | Active Poster Basic System |
| CL SIM | Contactless SIM |
| DDA | Direct Debit to Account in a bank |
| EFT | Electronic Funds Transfer |
| MNO | Mobile Network Operator |
| NFC | Near Field Communication |
| RF | Radio Frequency |
| RFID | Radio frequency identification |
| PCB | Printed Circuit Board |

4. BACKGROUND OF THE INVENTION

In conventional smart card systems, Card Issuers such Banks/Fls, Mass Rapid Transit (MRT) Companies Loyalty Companies have access to the cards only when the cardholder presents the card to a card reader/terminal which is connected to the issuers' backend systems via a communication network.

[A] This condition limits the card issuer's ability to offer new services such as a time bound promotions or value based discounts to enhance customer loyalty only when a cardholder presents the card to the terminal.

[B] Another problem is that, it also restricts the issuer's capability to block a card or a specific service on a card in case of defaults, card is stolen/lost, compromised security, etc increasing the risks or liability of misuse till such time as the card is presented to a terminal connected to the issuer network.

The mobile networks have high penetration coupled ease of use, with demand for new services. With increasing development in infrastructure, the Contact less Cards are easy to use with high level of convenience. Card issuer's demand for fast and efficient management of accessibility of a customer's smart card has steadily increased with the wide-spread utilization of wireless network communication for processing various customer sales, transactions and other services.

Accordingly, the present invention addresses a more efficient and productive manner of achieving the said through the integration of smart cards with Sim cards of mobile devices. CL SIM/(U) SIM/R-UIM with an existing CL card controller is attached with a antenna interfaced with an existing SIM/(U)SIM/R-UIM controller (dual chip architecture). CL interface uses a specially designed antenna which is provided to a partitioned, dedicated memory of a SIM controller (single chip architecture). Both the above configurations can be inserted in to existing handsets with SIM/(U)SIM/R-UIM card connector. With a CL SIM the card issuer's applications residing on conventional smart cards can be loaded unchanged in the separate, dedicated memory of a CL controller or SIM with CL interface. Besides savings in card issuance and maintenance cost, the issuers can securely access (using their own secret keys) their applications on the CL SIM thru the mobile network connectivity provided by the SIM. Similarly, it also offers several tangible benefits to mobiles users who also happen to be card holders. Cardholders can view history, updates, etc. on their own personal, trusted device—their mobile phone. The CL SIM Cards can be provisioned with EMV credit/debit soft cards over-the-air (OTA) and hence, mobile users can use their CL SIM/(U) SIM/R-UIM in handsets for payments at existing contactless card acceptance devices (POS terminals) or legacy POS devices with plug-n-play contactless adapters.

The transaction processing & settlement of all card transactions at POS locations requires live network connectivity for these terminals. With CL SIM/(U) SIM/R-UIM in cardholder's handsets, the transaction processing and settlement of these transactions can be routed through mobile user's handset using an appropriate wireless bearer. The distinct advantage of this method over the current process is the 'functionality where users handset' triggers the wireless transport bearer—hence can be utilized in remotest locations, where a POS terminal cannot be used in absence of a Telephone line (live network connectivity). Mobile Touch Transaction also enhances the operational efficiency of Mobile Network Operators revenue system on the other hand.

5. SUMMARY OF THE INVENTION

To overcome the above mentioned problems, the present invention proposes a method, integrated system and Active Poster for processing mobile touch transactions. The integration consists of a mobile or hand held portable wireless communication device with near field communication capability, an Active Poster with near field communication capability, a Contact Less (CL) Sim, CL Sim Controller with interface and issuer's or mobile network provider's application and a standard computer with networking capability. A mobile subscriber using a mobile or hand held portable wireless communication device with CL SIM simply touches Active Poster and initiates a business transaction. It is accomplished by using NFC (or near field communications) to transmit client information to the active poster. The secure client information, combined with the content of the active poster, generates a unique service offering that will be initiated by the back end server. The client or user of the hand held wireless communication device manually selects a mobile commerce transaction by pressing a button on the Active Poster. The Active poster communicates the selection of the mobile commerce transaction to the host computer through the telecommunication network. The computer if necessary communicates via telecommunication network to the handheld wireless communication device to complete the mobile commerce transaction.

6. BRIEF DESCRIPTION OF THE DRAWINGS

The present invention is illustrated with accompanying figures, which are given to illustrate an embodiment of the present invention. These are not intended to be taken restrictively to imply any limitation on the scope of the present invention.

Figure 6:
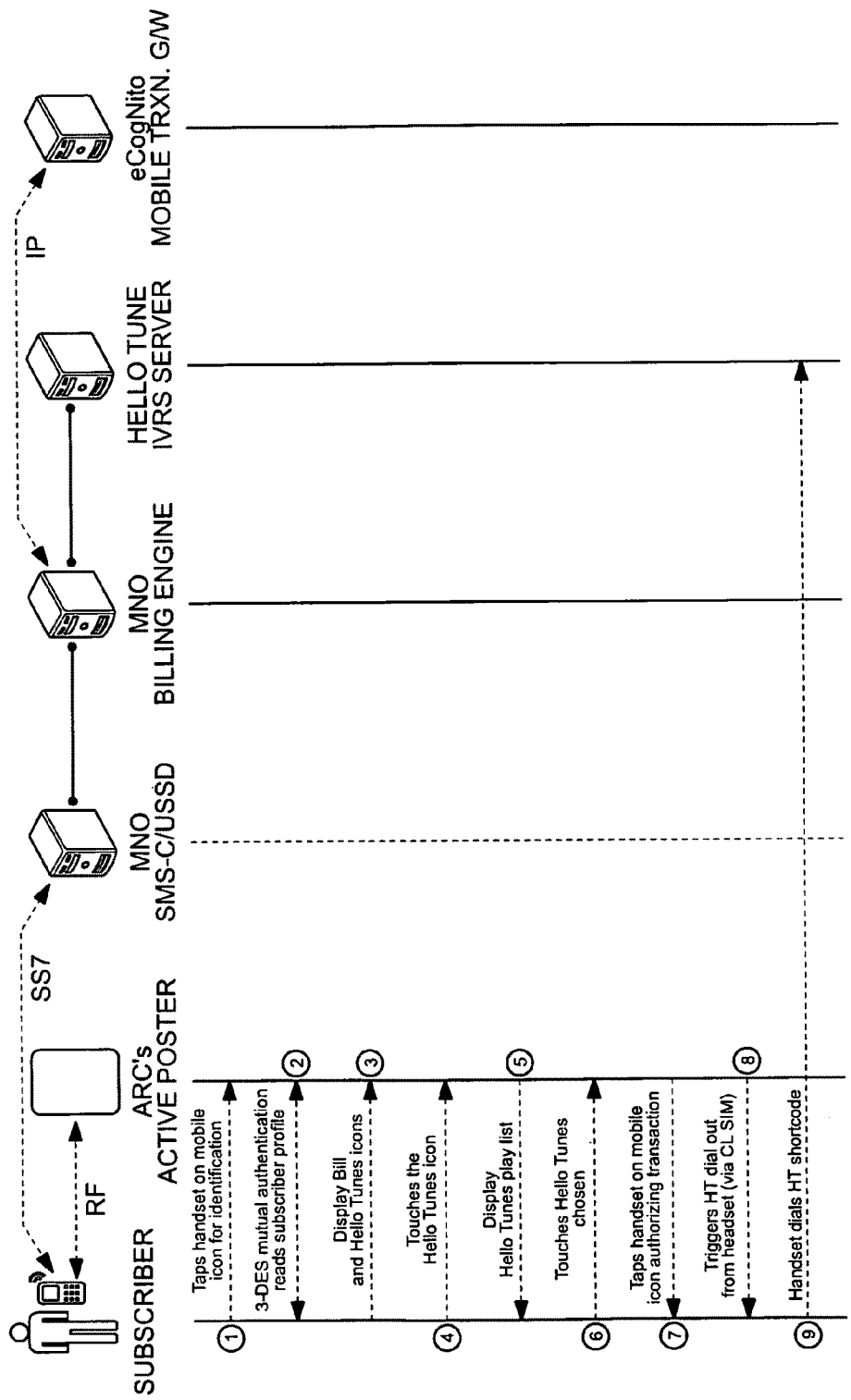

FIG. 6 schematically illustrates transaction of subscribing to hello tunes, according to one embodiment of the invention.

Figure 7:
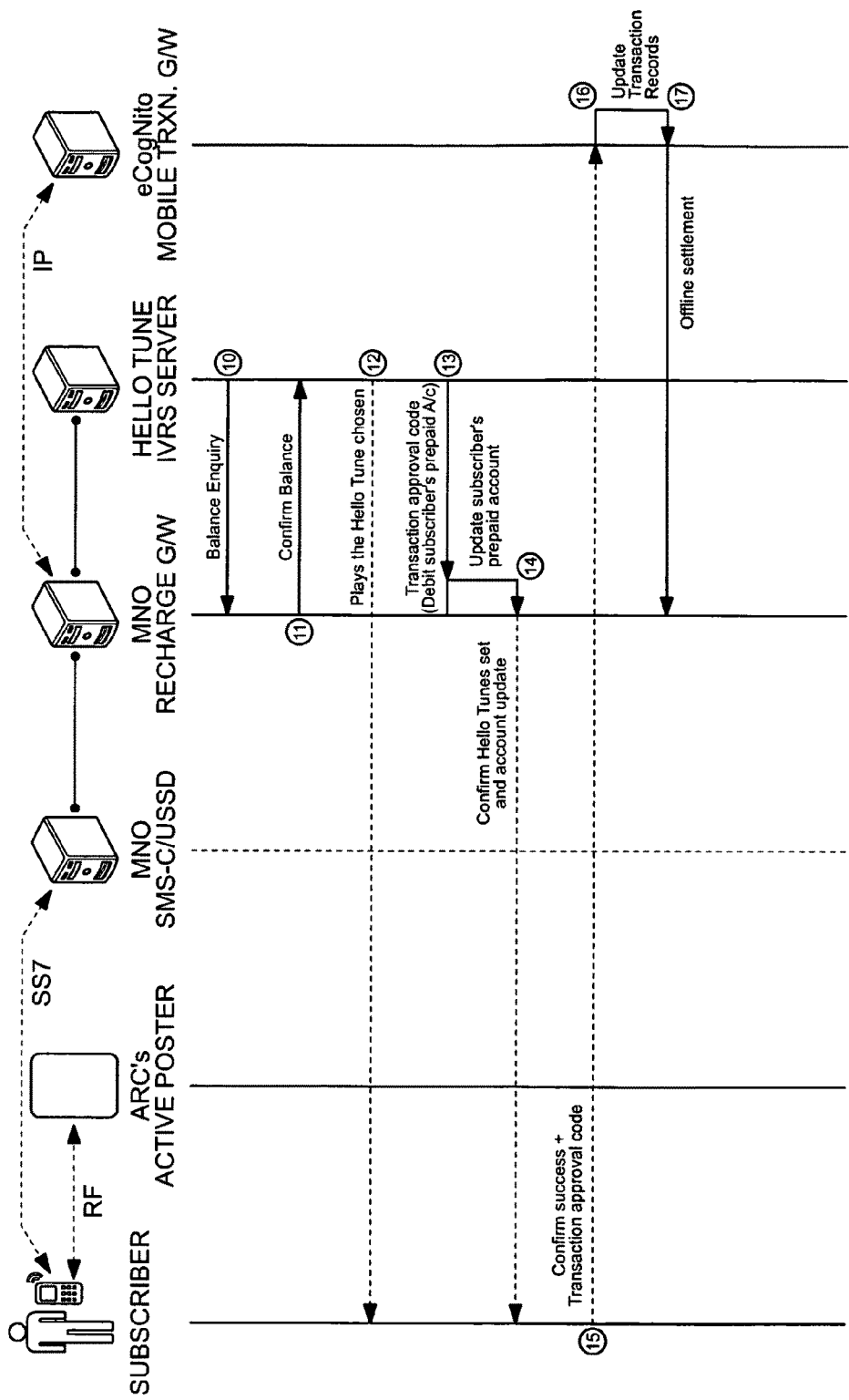
Figure 8:
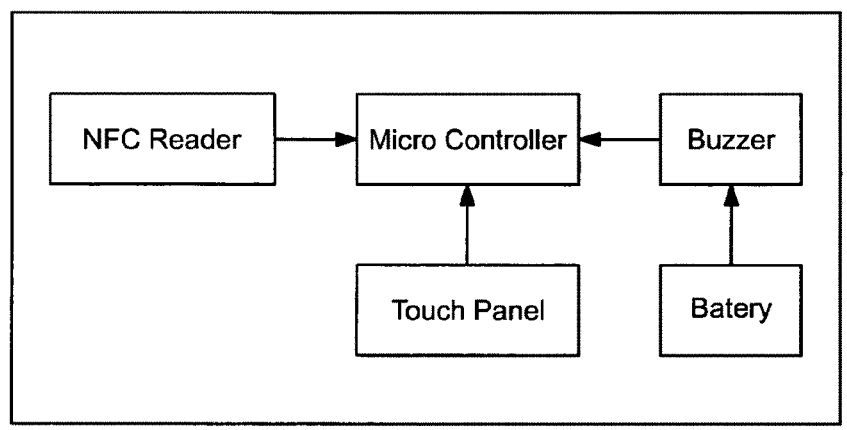
Figure 9A:
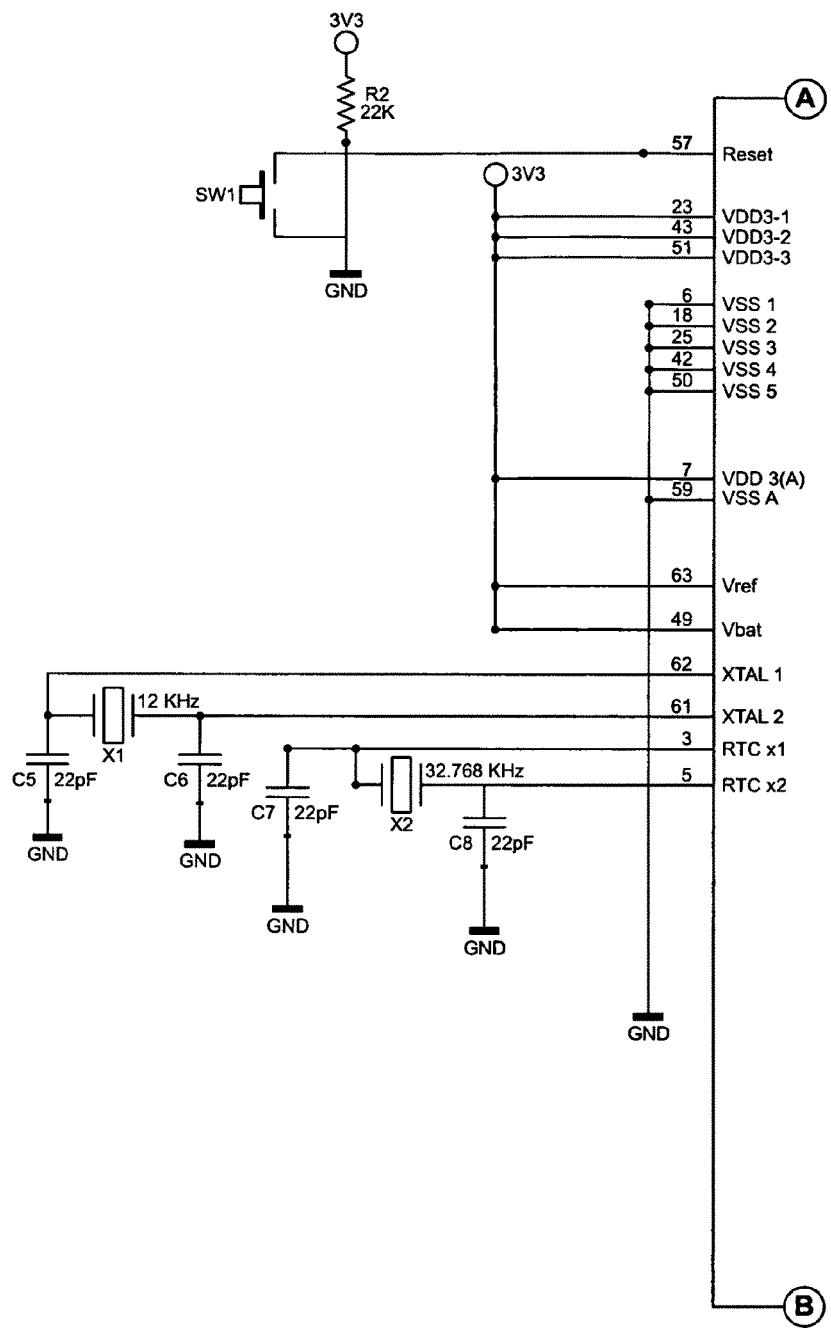
Figure 9A:
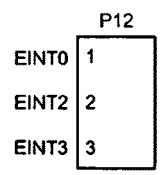
Figure 9B:
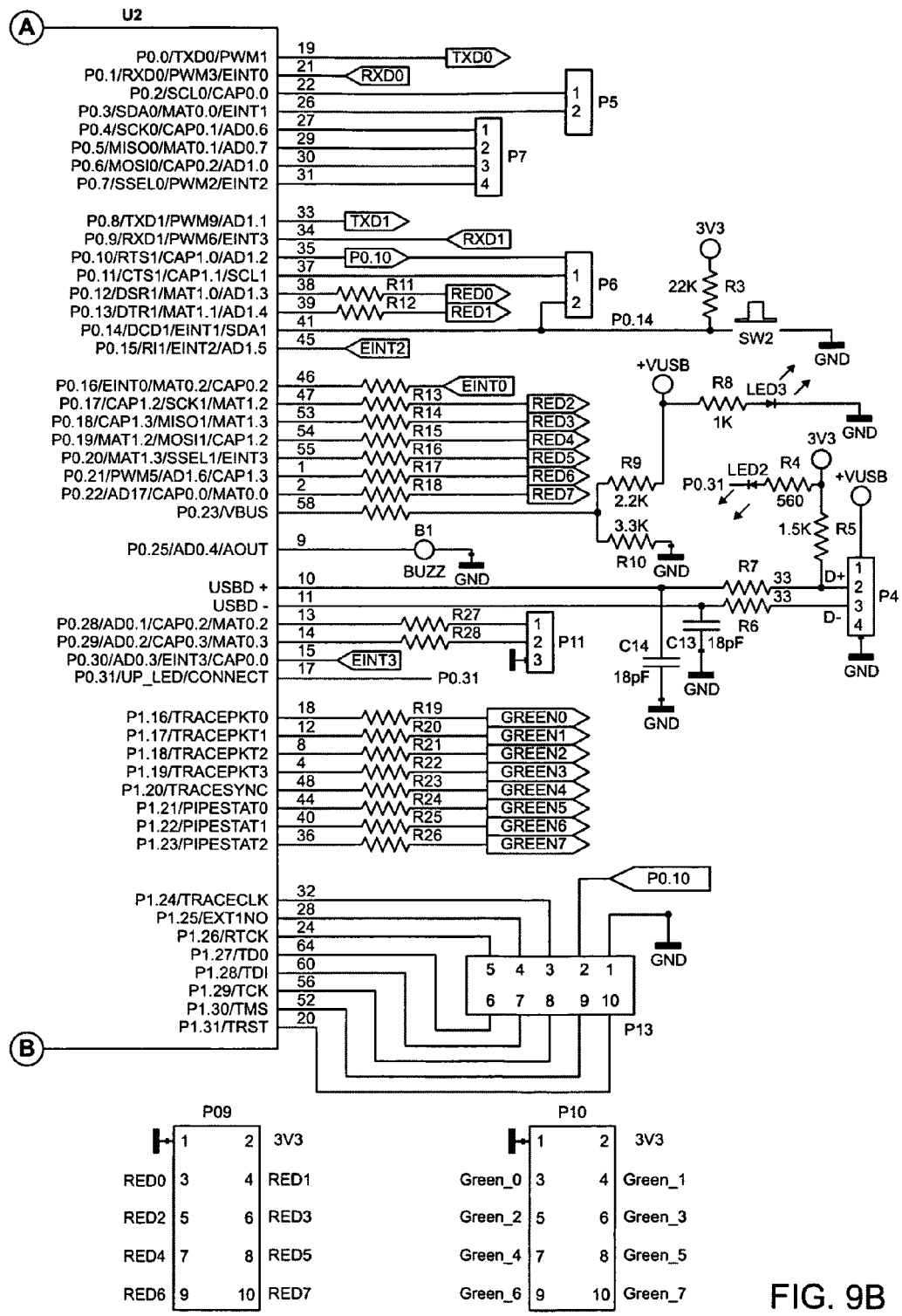
Figure 10:
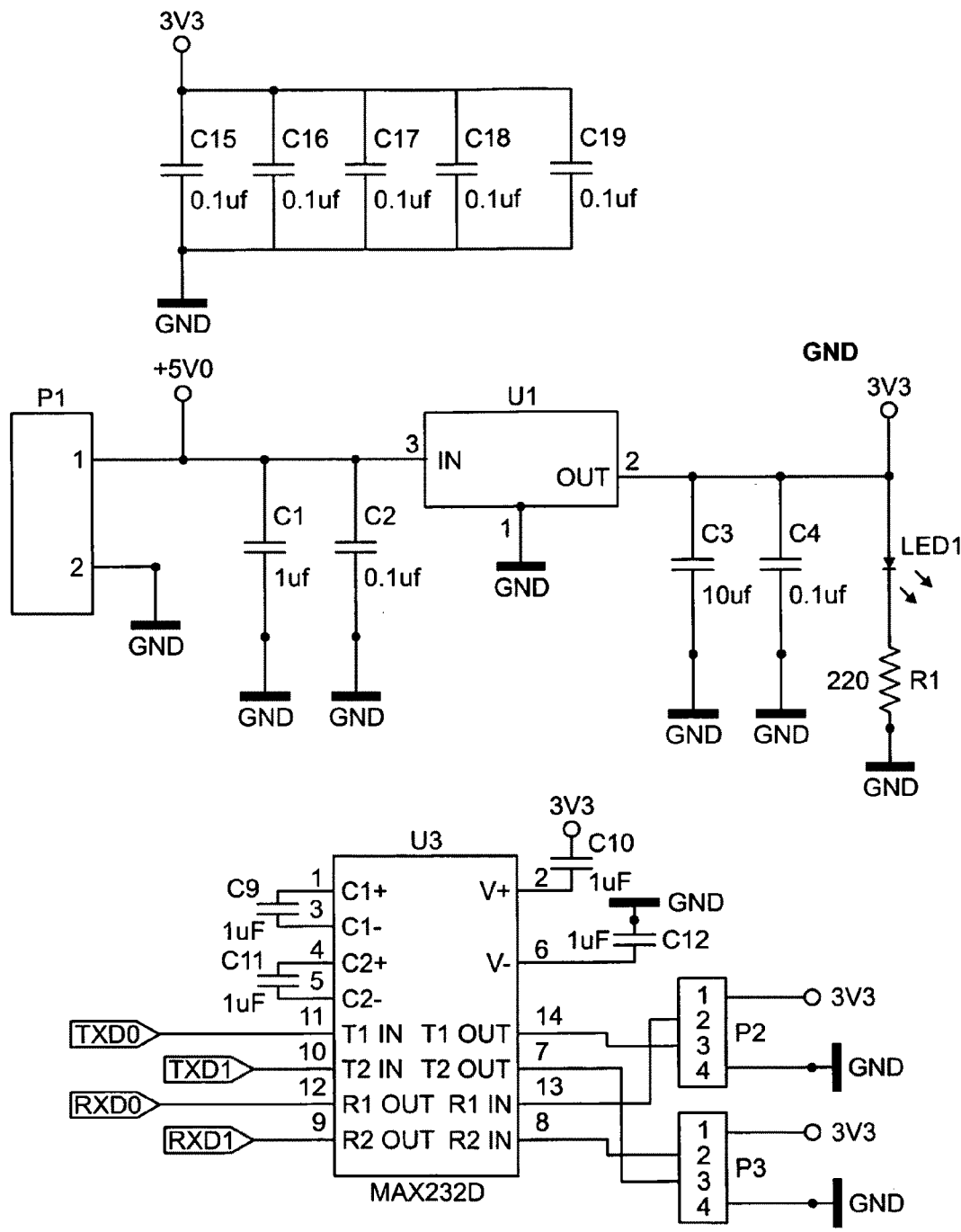
Figure 11A:
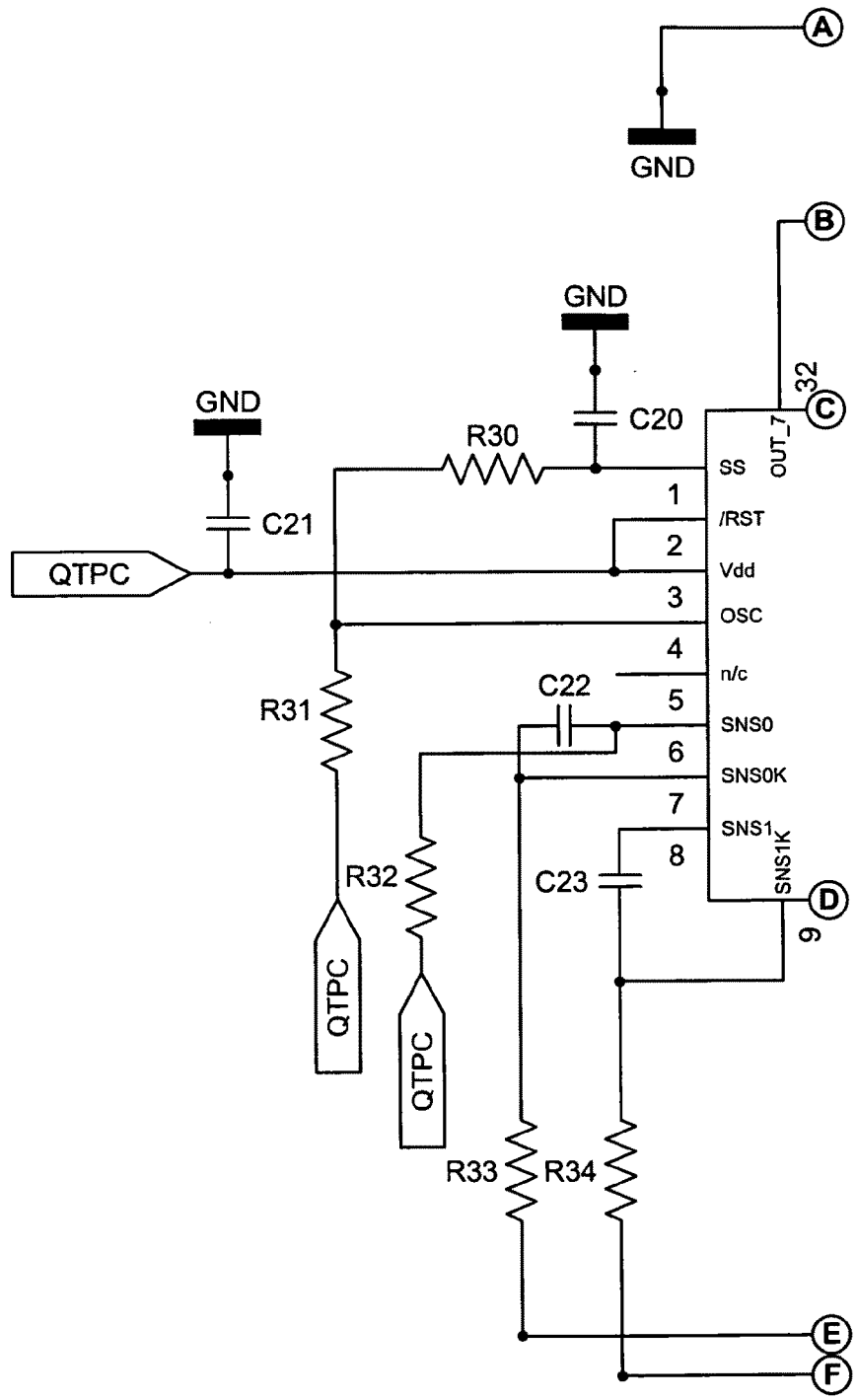
Figure 11B:
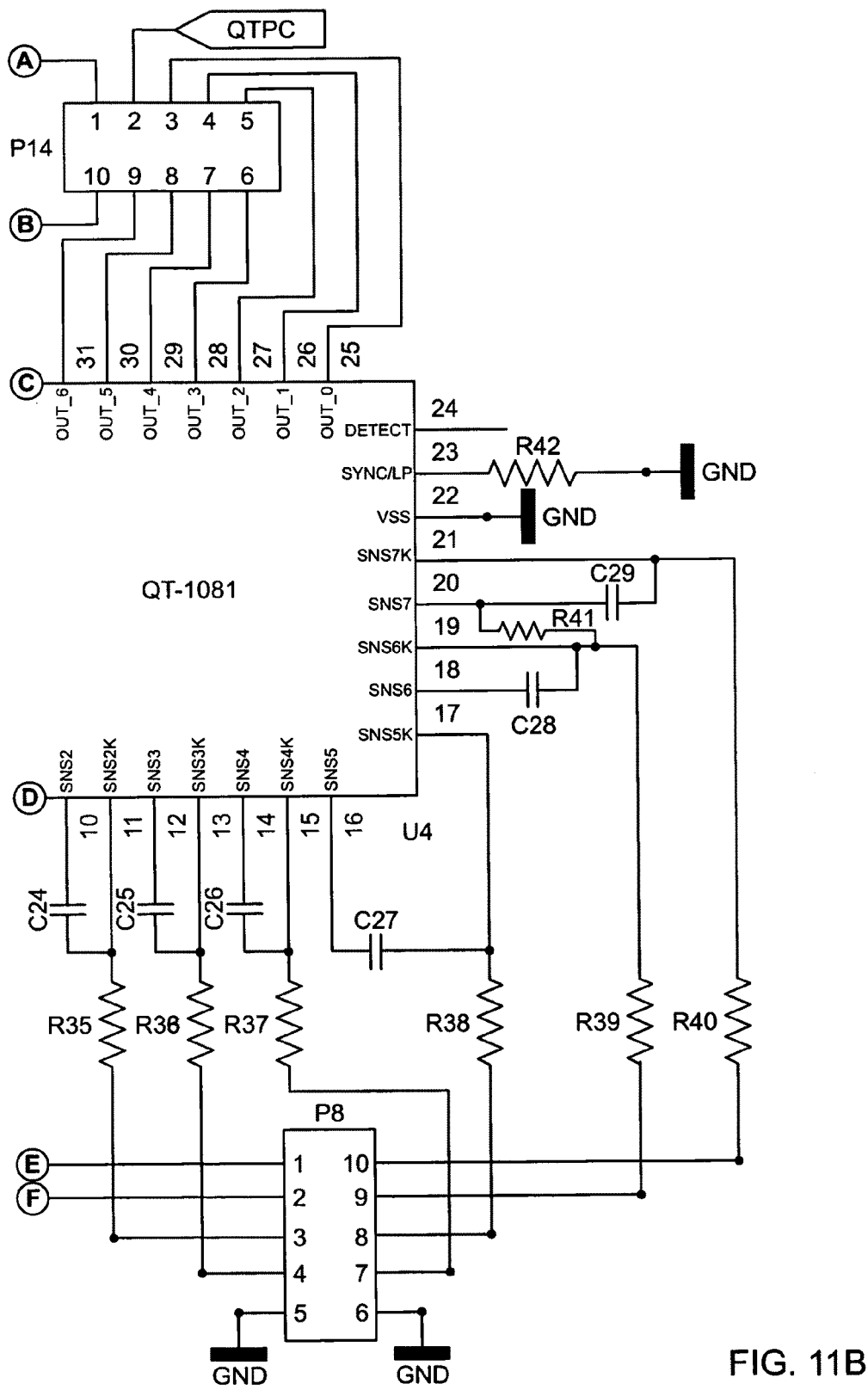
Figure 12:
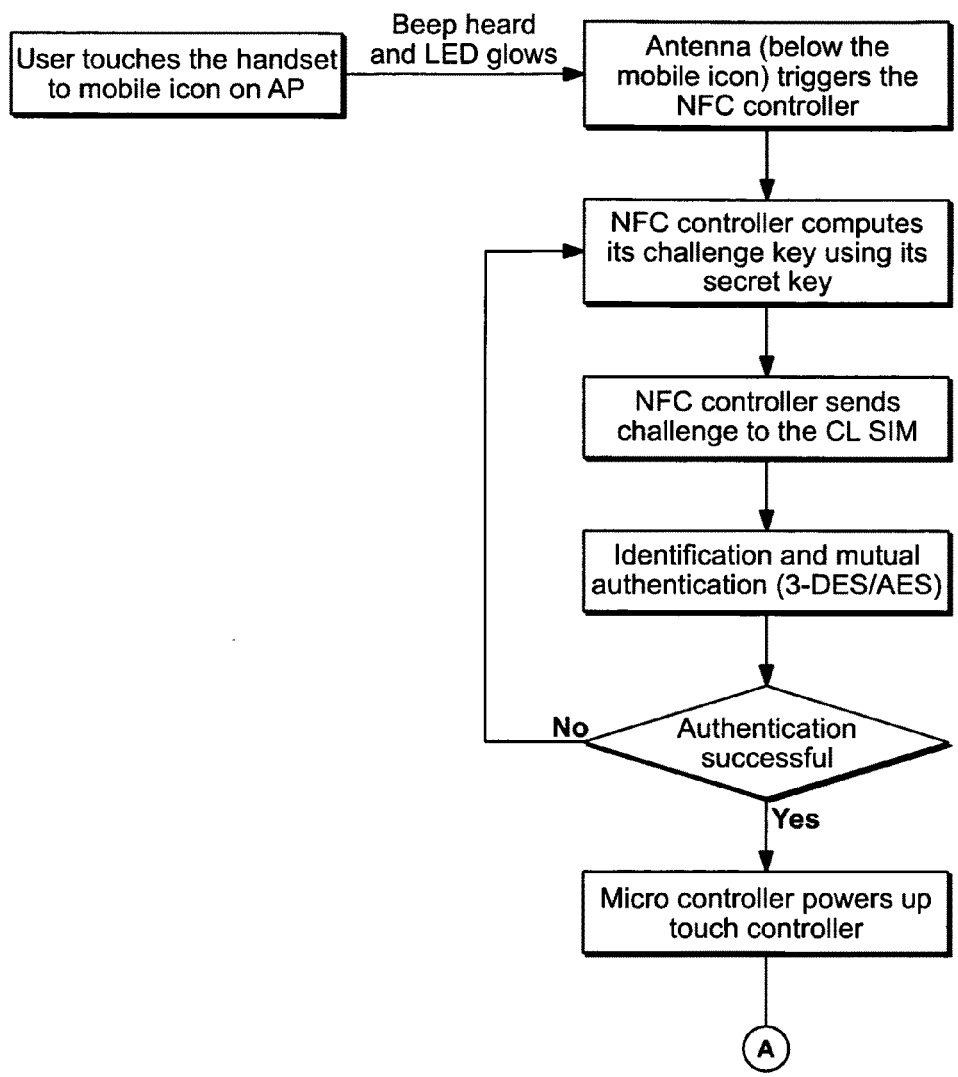
Figure 13:
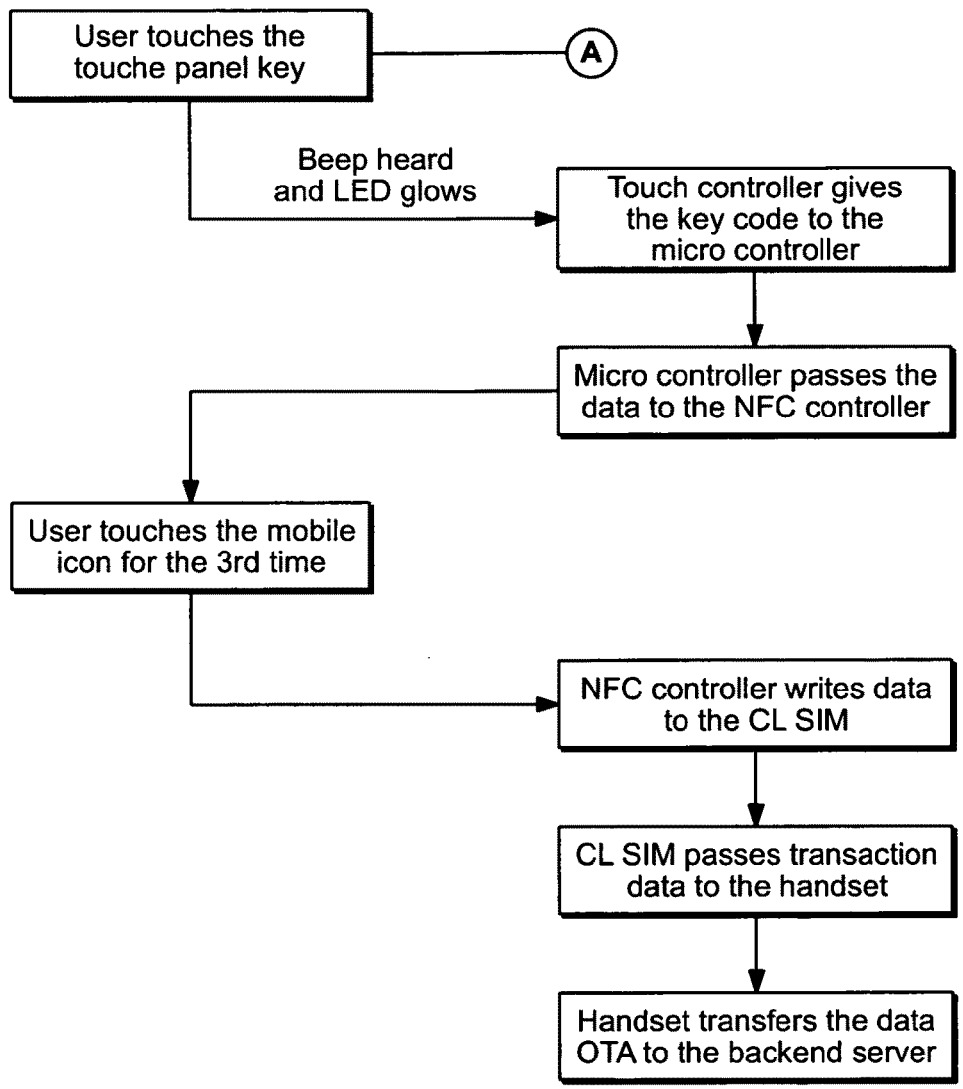

FIG. 7 also illustrates transaction of subscribing to hello tunes, according to one embodiment of the invention FIG. 8 illustrates the block diagram of the Active Poster according to one embodiment of the invention FIGS. 9A, 9B, 10, 11A and 11B schematically illustrates the Circuit of the Active Poster according to one embodiment of the invention FIGS. 12 & 13 illustrates the flow chart of the transaction of a subscriber with a Mobile device or wireless handheld communication device according to one embodiment of the invention.

Figure 14:
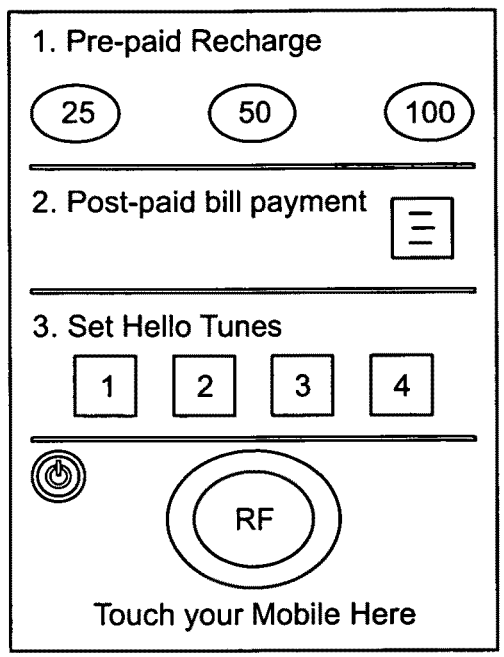

FIG. 14 illustrates the Active Poster Basic

Figure 15:
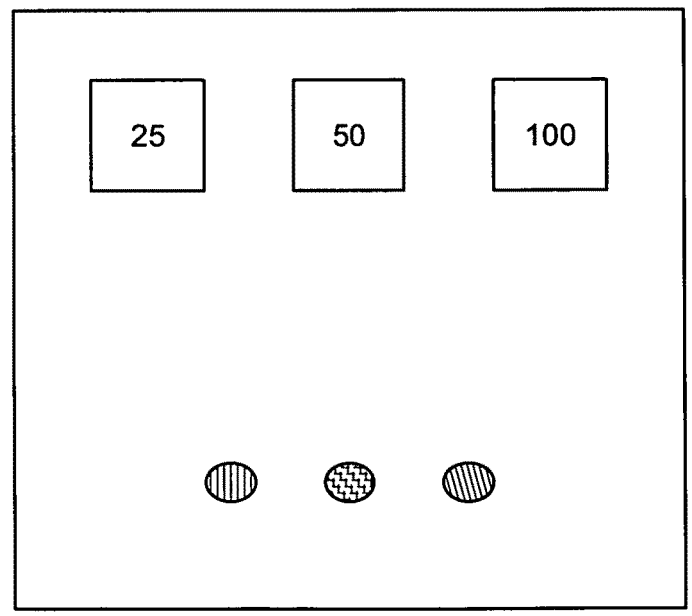

FIG. 15 illustrates the RF Pin-pad

7. DETAILED DESCRIPTION OF THE INVENTION

Exploration of two unique but unrelated technologies—RFID and Touch Sensing to enable Near Field Communication like features in millions of existing mobile handsets, led to the development of this unique mobile touch transaction platform. The easy-to-use, simple and intuitive touch interface simplifies and speeds up day-to-day mobile transactions and is ideal replacement for smart cards being used for different applications presently.

The invention offers SIM-centric solution as MNOs wants to have the control of CL SIM based-services for non-telecom applications, as they see it as a new revenue stream opportunity.

It offers the choice of different business models such as:
Hosting, referral, transaction fees
Increased stickiness
Additional data traffic revenues It also minimizes the infrastructure requirement and costs as the applications provisioning systems for SIM are already in place and can be reused and have been tried and tested for more than a decade for reliability, scalability and security. It is compatible with NFC technology. The CL SIM solution will work with 3G networks and can be upgraded with a software upgrade to be used in next generation mobile networks LTE, 4G, etc. The CL SIM/NFC enabled mobile phones enhance service offerings as it is trusted environment on the phone to host application.

The CL SIM/NFC enabled mobile phones allow secure remote management of applications running on the phone like installation, personalization, life cycle etc. The CL SIM/NFC enabled mobile phones can be programmed with much stringent security certification level than any banking card used internationally. e.g. Magnet stripe cards, Chip cards (EU) and Contactless cards (US & Asia).

Figure 1:
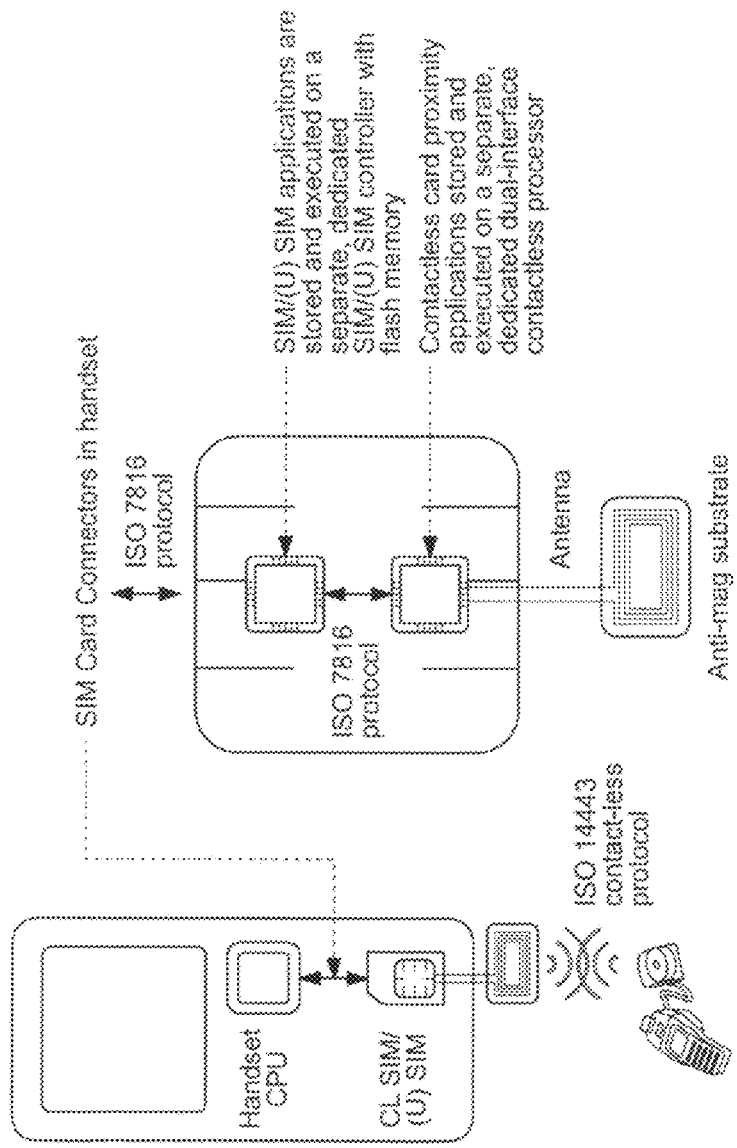
FIG. 1 illustrates Contact-less Sim

The method and integration of carrying on the transaction of the above invention is given below:

i). An embodiment of the presently disclosed invention is Contact-less SIM illustrated by FIG. 1, which is a unique dual chip architecture designed to fit into a SIM Card form factor 1—ID-000 size defined in the ISO 7810 standard. One chip is a SIM Controller with 4 KB RAM and 100 KB Flash memory (free space) for network and service specific directory/files, STK applets and other application data files, as per the MNO's requirements. The other chip is Contactless Processor with approx. 8 KB EEPROM (free space) for existing and new contactless card applications requiring high security.

ii). Another embodiment of the invention is SIM Controller
Key features vis-à-vis existing SIM Cards having EEPROM memory:
Flash memory offers faster read/write speeds.
Existing on-card applications can be updated (overwrite) and new applications (applets) downloaded over-the-air (OTA) to the SIM throughout the card's lifecycle.
Total compliance with all telecom standards (GSM/3GPP/ETSI and ISO)

iii). Yet another embodiment of the invention is CL Processor.
It is a Triple-DES coprocessor
Single DES and triple-DES, based on two or three DES keys, can be executed within less than 40 m. seconds
Standards (ISO/IEC, ANSI, FIPS) and Message Authentication Code (MAC) are fully supported
PKI coprocessor (RSA, ECC)
Supports the trend of increasing RSA keys with faster execution speeds as well as Elliptic Curve Cryptography (ECC) based on GF(p) or GF(2n) at best performance.
SHA-1, SHA-224 and SHA-256 hash algorithm
Pseudo-Random Number Generator (PRNG)
Reached target of the certification is CC EAL5+.

iv). The Dual sim architecture prepared with the above mentioned embodiments has below mentioned unique features in addition to the least common denominator of contact less cards:
Subscribers can view CL application data on their handset display by selecting the application under the MNO's STK menu Ex. last 10 transactions history, receipts, check balance, view ticket info, loyalty points accrued, etc.

New applications from third party service providers can be downloaded and existing ones updated OTA to the CL processor via the SIM controller.

Transactions can be initiated in two modes:

Subscribers can initiate a transaction in auto mode without any handset 'key presses' by touching handset to the 'mobile icon' below the display on the AP.

Figure 2A:
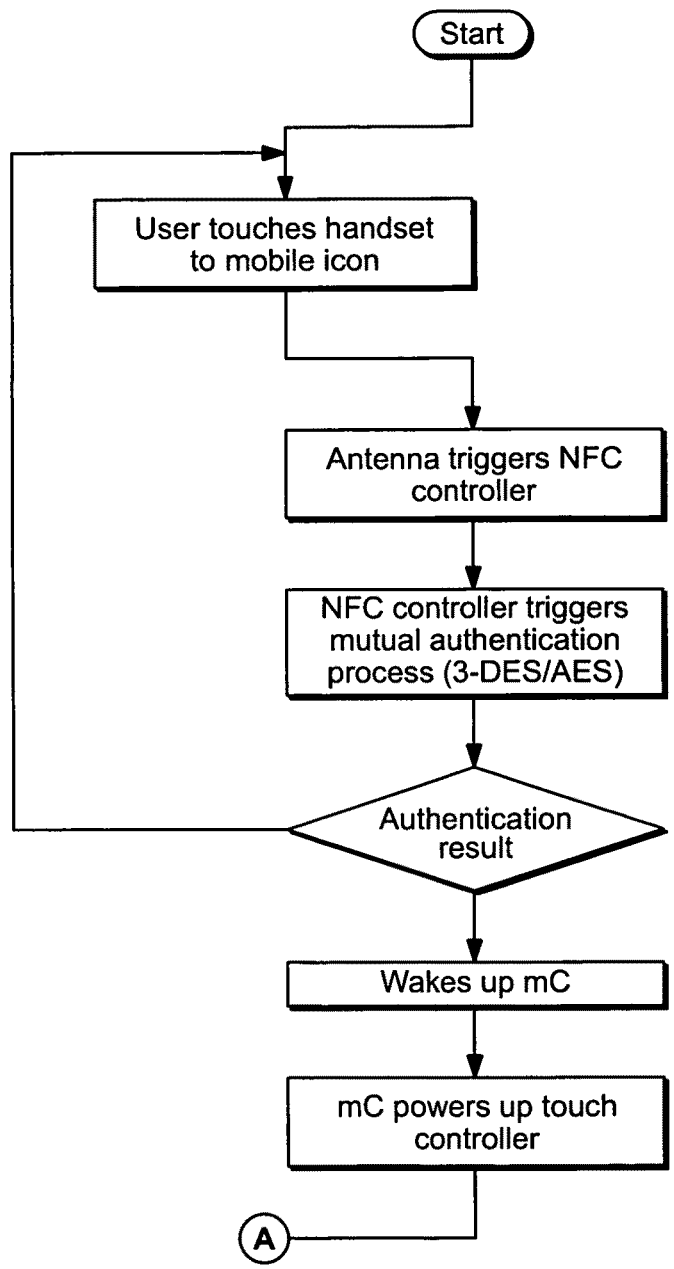
FIGS. 2A and 2B illustrates the AP Bx Transaction Flow incorporating an embodiment of the invention.
Figure 2B:
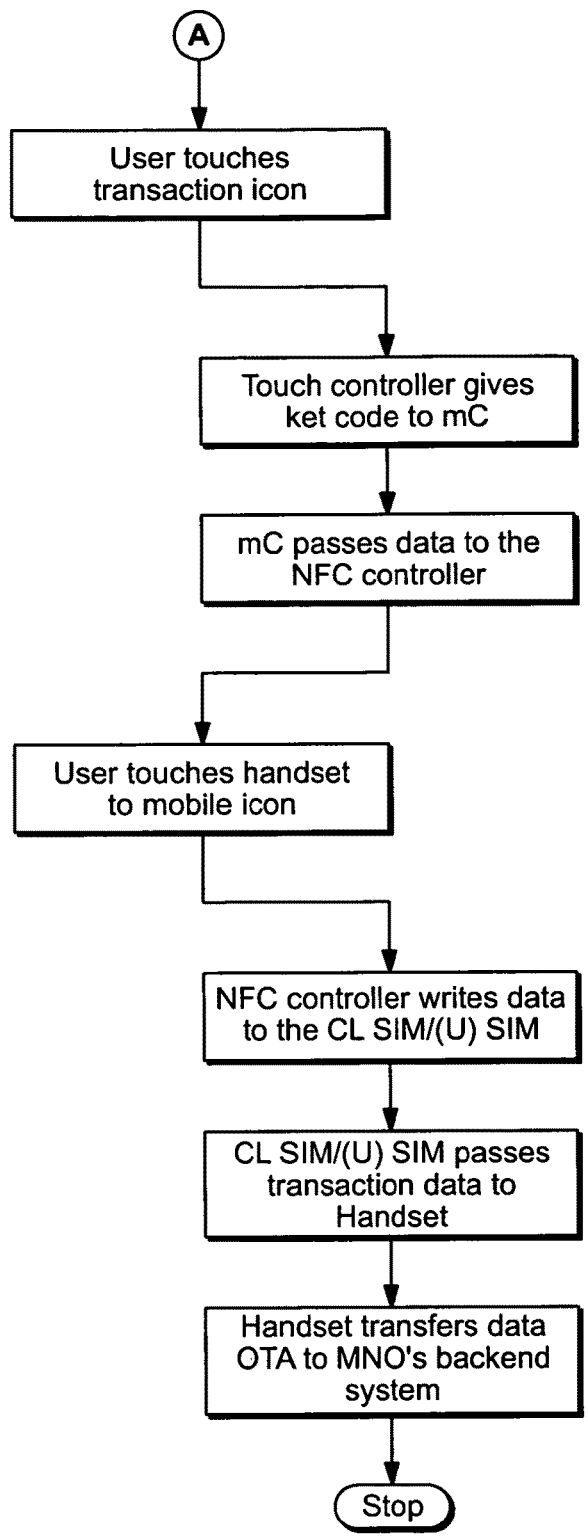

In the manual mode, illustrated by FIG. 2 the subscribers can browse through the menu on their handset screen to select a application under STK menu and then authorize the transaction by touching the handset through' glass to the 'mobile icon' below the display on the AP.

Compatible with existing contactless card applications Ex. automatic fare collection (AFC) system of Delhi Metro, smart card ticketing of Mumbai Suburban Railway and Indian Railways.

v). Yet another embodiment of the invention is Active Poster (AP): A 'touch-n-display unit' is a terminal device where Subscribers with CL SIM in their handset can visit any Active Poster device locations to carry out a transaction in 'auto' or 'manual' mode for any telecom or non-telecom application they have registered for and activated by their MNO. Active Poster is made up of a thin, lightweight touch enabled 6"/8"/9.7"/10" sized e-Paper, display or slim touch screen LCD display, printed RFID antenna and short range radio module encapsulated in a PET polymer substrate, to resemble a single poster. The FIG. 8 illustrates the block diagram of the Active poster.

Active Poster Basic System includes the below mentioned components:

NFC Reader:

Near Field Communication (NFC) is a short-range high frequency wireless communication technology which enables the exchange of data between devices over about a 10 centimeters (around 4 inches) distance.

The NFC Reader acts as a medium that receives User ID (UID) from the User when the RFID/NFC enabled handset is brought near the active poster and sends it to the Micro-Controller.

Micro-Controller:

The Micro Controller used is LPC 2148 (ARM7). This controller gets the UID from the NFC Reader over a serial link and the key input from the user through the touch panel and performs the respective functionality.

Touch Panel:

Touch Panel mainly contains of 6 keys which are used to select the value added services provided by the MNO, out of 6 keys 3 are used for prepaid recharge, two for the caller ring back tune and one for post paid bill payment for the User Buzzer:

A buzzer or beeper is a signaling device, usually electronic, typically used in automobiles, household appliances such as a microwave oven, or game shows. The buzzer gives short and long beeps which indicate the user about the status of the transaction.

Power Supply:

A 9V AC power supply is used to power up the active poster. It supplies the power to all the devices on board. Battery provision is also made for continuous operation of the application.

The Specification of the components of Active Poster is as follows:

Microcontroller

ARM7 (NXP-LPC2148) @ 12 MHz, 32-bit NFC Reader Module —APDA

Communication protocol—ARYGON (HL—high level language)

Operational Frequency—13.56 MHz

Interface—UART (CMOS-TTL), 12C or RS232

Power supply—+3.3 VDC . . . +5VDC3

Power consumption—Aprox. 95 mA

Antenna Integrated

Reading distance Up to 45 mm/1.77 inch (passive and RFID as well)/70 mm/2.76 inch (active)

Dimension (L×W×H) 59×32×2, 5 mm/2.32×1.26×0.098 inch

Operating temperature: −20° C. to +80° C./−4 F to 176 F

Storage temperature: −40° C. to +85° C./−40 F to 185 F

Touch Panel Interface

QT1081 (Touch Panel Controller)

Total numbers of touch keys are 1 to 8.

Technology used is spread-spectrum is patented spread-spectrum charge-transfer.

Electrode materials used are copper, silver, carbon, etc.,

Panel materials can be plastic glass, composites, patented surfaces (low particle density metallic paints possible).

Panel thickness up to 50 mm glass, 20 mm plastic (key size dependent).

Key sensitivity settable via change in reference capacitor value.

Power consumption 2.8v~5.0v<15 QA (8 keys at 2.8v, 340 ms low power mode).

Package 32-pin 5×5 mm RoHS compliant

Signal processing self-calibration, auto drift compensation, noise filtering, patented Adjacent Key Suppression.

Circuit Description:

LPC 2148 is the Micro Controller (ARM 7). It is a 32-bit Microcontroller with 512 KB on-chip Flash ROM and 32 KB RAM. It works on a crystal frequency of 12 MHz. The controller gets the UID from the NFC Reader over a serial link and the key input from the user through the touch panel and performs the respective functionality. LPC2148 is used for APBX module where as for the design Active Poster Multimedia (APMX) will have higher end processors like ARM9 which have capabilities to handle high graphics, video format display.

The NFC Module, which reads the User ID (UID), is connected to the UART0 of the Micro-Controller.

The QT1081 is an improved, lower cost, simplified circuit version of the popular QT1080 sensor IC. The QT1081 is designed for low cost appliance, mobile, and consumer electronics applications. This controller senses the key touched and send the key to the microcontroller.

The MAX3232 device consists of two line drivers, two line receivers, and a dual charge-pump circuit (serial-port connection pins, including GND). The device meets the requirements of TIA/EIA-232-F and provides the electrical interface between an asynchronous communication controller and the serial-port connector.

The operating voltage range of LPC 2148 is 3.0V to 3.6V (3.3 V±10%) with

5 V tolerant I/O pads and the operating voltage range of QT1081 is 2.8V to 5.0V.

It can be mounted behind a shop's front glass, walls or partitions or be placed on a desktop/tabletop. A separate 'base unit with a thin, lightweight touch enabled 6"/8"/10" e-Paper, printed RFID antenna and short range radio module encapsulated in a PET polymer substrate, to resemble a single poster. It can be mounted behind a shop's front glass, walls or partitions or be placed on a desktop/tabletop. A separate 'base unit' approximately the size of a desktop calculator with 'soft keys' and a small 1-line×8 characters e-Paper display, for the Retail Counter to enter and view the amount received for cash transactions.

FIG. 14 illustrates the Active Poster Basic

The way mobile commerce transactions are done using the Active Poster is best illustrated in the FIGS. 12 & 13 which is as follows:
a) The user touches the wireless hand held device near the Mobile icon on the Active Poster.
b) A beep sound is heard and the LED glows indicating the activation of the Active Poster.
c) The Antenna (below the mobile icon) triggers the NFC controller.
d) The NFC controller computes its challenge key using its secret key.
e) NFC controller sends challenge to the CL SIM.
f) It is followed by the process of Identification and mutual authentication (3-DES/AES).
    If the authentication is successful the microcontroller powers up the touch controller.
g) If the authentication fails then the NFC controller has to again compute its challenge key using its secret key.
h) Once the Touch controller is active the user touches the touch panel key.
i) Beep is heard and LED glows.
j) The Touch Controller gives the key code to the Micro controller.
k) The microcontroller passes the data to the NFC controller
l) User touches the mobile icon for the third time.
m) NFC controller writes data to the CL SIM
n) CL SIM passes transaction data to the handset
o) Handset transfers the data to the back end server.

The unit can be an onboard wireless module (GSM/GPRS/Wi-Fi) to download and store the ad/promotional material, content, firmware updates, etc from a remote server (content repository) hosted at inventor's office or any other service provider. The downloaded content will be transferred over the above mentioned local RF link to the 'touch-n-display unit'. This onboard wireless module also can be used for user data authentication Description of the Active Poster Basic System:
The Active Poster Basic is illustrated by FIG. 14.
The Active Poster Basic provides three services namely prepaid recharge, post-paid bill payment and setting hello tunes. The Poster is equipped with on/off button, charger, three denominations, confirmation icon for post paid bill payment, four hello tune options and space to tap mobile or any NFC enabled wireless handheld communication device (radio). The Payment mode is cash or DDA, which is described elsewhere in the description.

Also present on the Active Poster Basic are a LED encircling the mobile icon that glows green or yellow or red and an audio buzzer providing audio-video feedback to indicate status of the event.

Description of the RE Pin-pad:
The RF Pin-pad is illustrated by FIG. 15.
The RF pin-pad contains soft keys (touch buttons) to authorize cash transactions.

It has first three buttons of different denomination in local currencies which correspond to prepaid recharge. The RF pin-pad also has three LEDs, red, yellow and green indicating status of the transactions.

The RF pin-pad interacts with the APBx via RF link with in a range of 10 meters.

vi). AP Lite.
A stripped down, low cost version of the AP for a matchbox distribution model. It will have a small flexible board with the circuitry, printed antennas and a rechargeable battery attached to a thin transparent polycarbonate sheet. The board will be covered by a printed poster with a cutout for a 4-line× 20 characters e-Paper display for subscribers to view transaction details. This model will have selective applications and will not have network connectivity. An option to update the firmware/program code for new application(s) by touching a handheld terminal can be developed.

vii). The integration can be used for Ads & Promo Service due to its Simplicity. It is Easy to manage content scheduling and deployment and also easy to group ads/promos for specific uses or time-of-day content. It is Scalable because of its ability to roll out APs and grow to support thousands reliably. Additionally it enables Central control management of content.

It can be synchronized with application being used by a subscriber (transaction mode) to auto switch to alternate data bearer in the wireless network for seamless, non-disruptive operation. The integration is flexible and has the ability to tailor content delivery by screen, time of day or location and Supports media types—text, images and animated graphics (B&W and 8-bit Grayscale mode.

viii) It provides un-parallel Security. Highly secure hardware based 3-DES mutual authentication of CL SIM card (crypto processor) and Terminal Devices (security access module) before every transaction. It is also Compliant with Global Platform* Card Specification, v2.2, which includes Public Key Infrastructure (PKI) functionality, support for dual-interface contact/contactless smart cards and Over-the-Air Card Content Management capabilities. As a result of Global Platform's close collaboration with ETSI, the OTA feature will benefit the mobile telecom industry by allowing SIM cards that have already been distributed in the field, to be updated dynamically and cost effectively over-the-air, while ensuring the highest possible security schemes are retained.

Pilot Applications:

BEST MODE OF WORKING THE INVENTION

Figure 3:
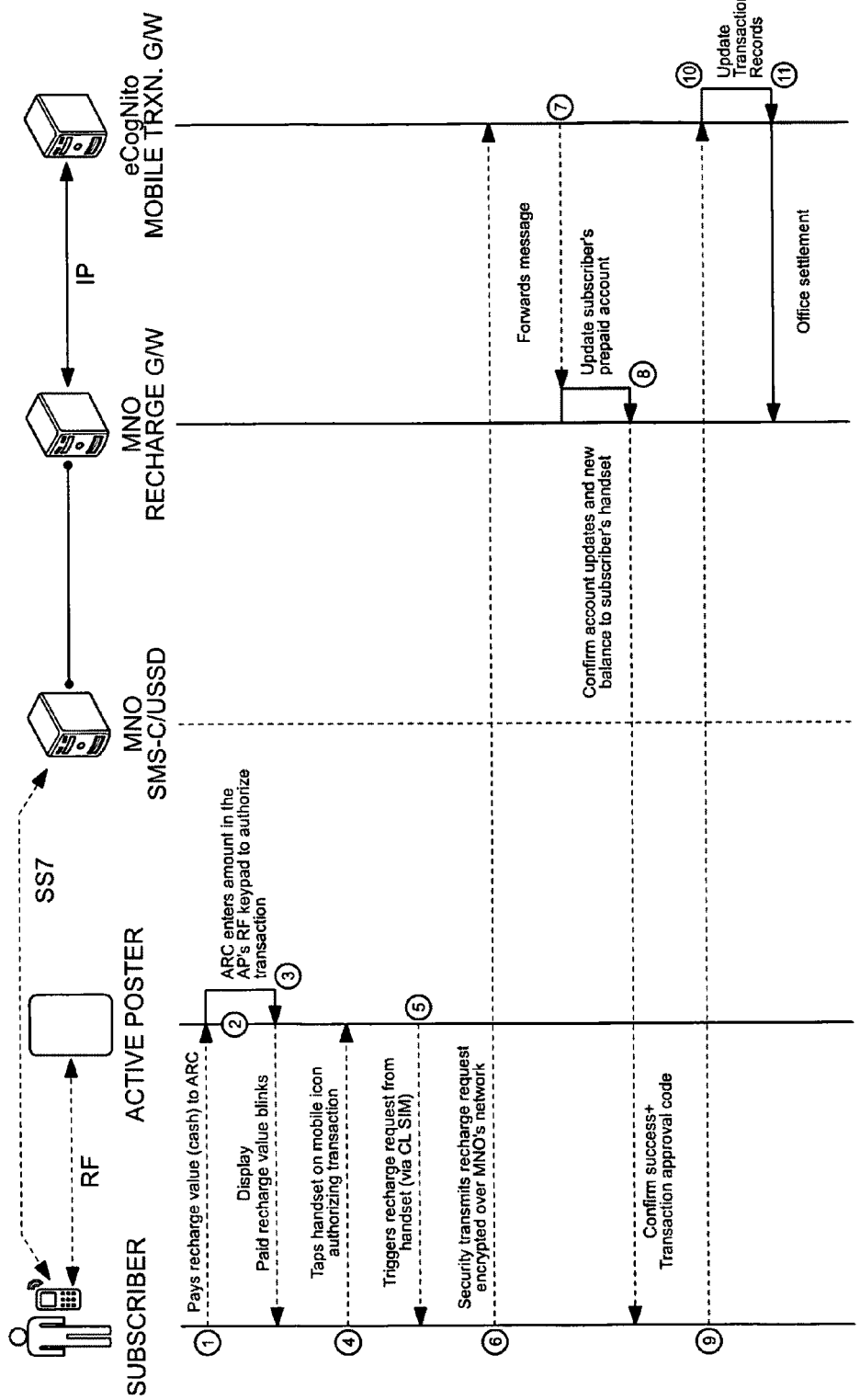
FIG. 3 illustrates the transaction—Prepaid Recharge: Cash Payment to ARC
Figure 4:
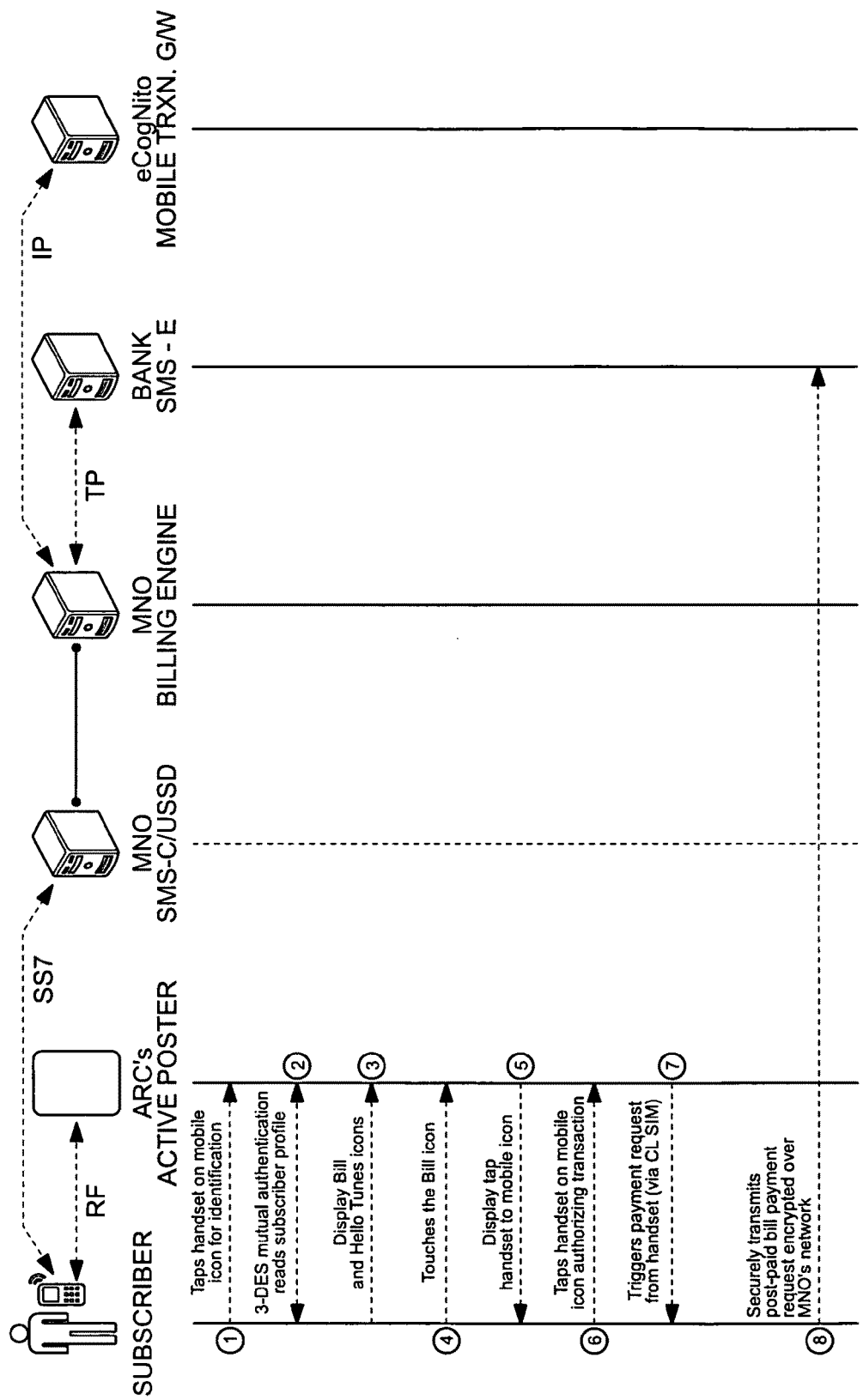
FIG. 4 illustrates the transaction—Post paid bill Payment according to one embodiment of the invention.
Figure 5:
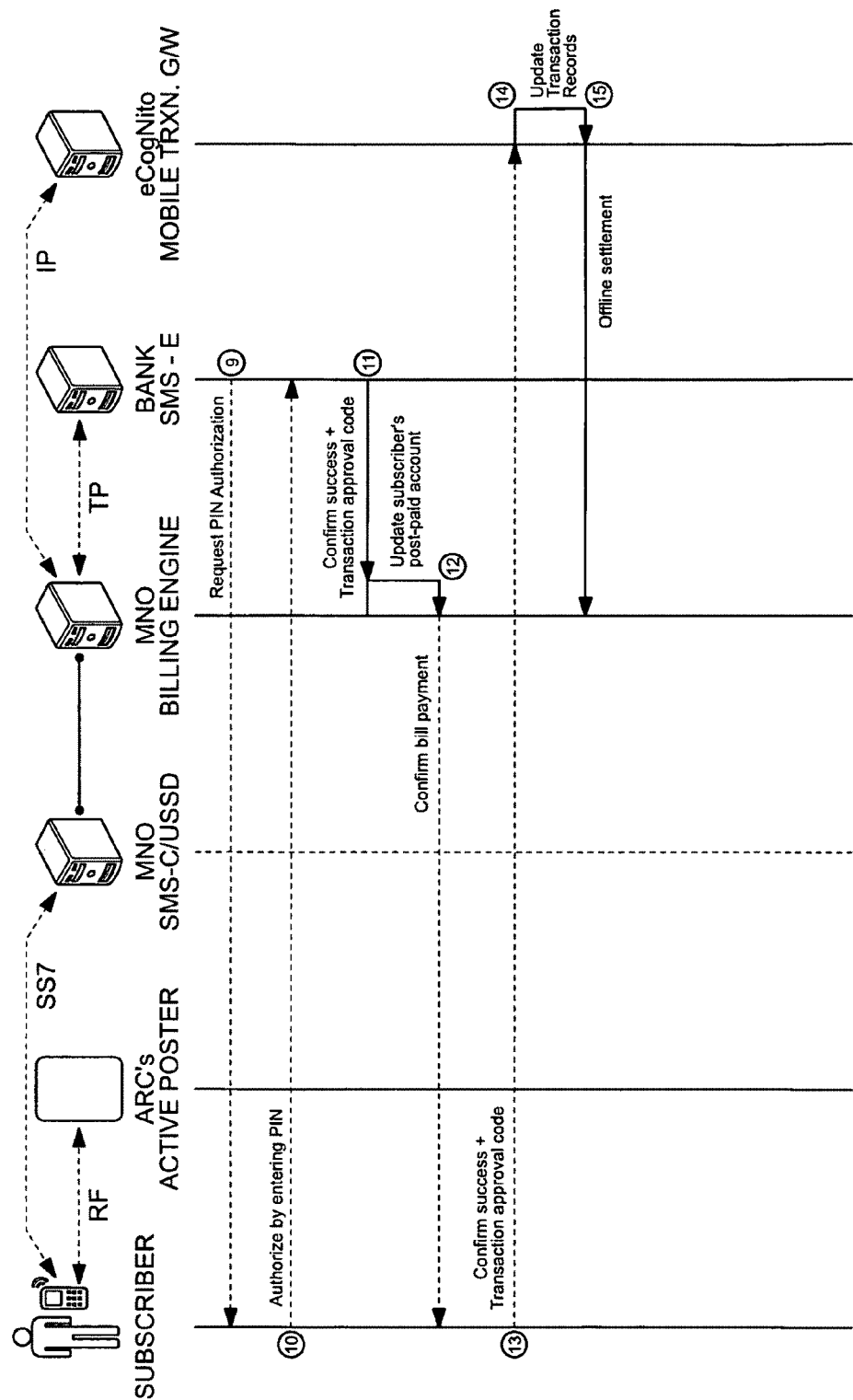
FIG. 5 illustrates Post paid bill Payment according to one embodiment of the invention.

The best mode of working the invention is demonstrated by the process followed in the detailed description. The method and integration of embodiments of the invention will cover three telecom applications which generate more than 90% of a MNO's annual revenues enabled by three existing modes of payment.

a). Prepaid Recharge:
A Prepaid subscriber's mobile with CL SIM inside will automatically send an airtime top-up request to MNO's recharge gateway for a 'value' touched by the subscriber on the screen, followed by touching the handset to the 'mobile' icon on the AP to authorize the transaction. It is illustrated by FIG. 3.

b) Postpaid Mobile Bill Payment
A Postpaid subscriber's mobile with CL SIM inside as illustrated by FIGS. 4 & 5 will automatically send a mobile bill payment request to MNO's billing system for a 'value' touched by the subscriber on the screen, followed by touching the handset to the 'mobile' icon on the AP to authorize the transaction.

c) Hello Tunes (Call Back Tones)
As illustrated in FIGS. 6 & 7, A subscriber's mobile with CL SIM inside will automatically dial out the Hello Tunes short code for the music/song 'image' touched by the subscriber on the AP screen, followed by touching the handset to the 'mobile' icon on the AP to authorize the transaction. For 'cash' payment to the ARC, the request will be directly sent to MNO's system whereas for a direct debit to account (DDA) payment, it'll be routed via the subscriber bank's server.

d) Payment Options

The subscribers can opt for one of the following modes of payment given below:

Cash

A cash transaction step-by-step will be as follows:

Subscriber hands over the amount to the ARC cash counter and moves in front of the glass or wall mounted AP.

While the subscriber touches his/her handset to the 'mobile' icon on the AP, the ARC staff presses the 'soft key' on the RF Pin-Pad for the amount received.

The AP reader passes a 'recharge' command (with the amount) to the CL SIM which includes a random '4-digit transaction code' (alpha numeric).

CL SIM triggers the handset to send a structured SMS with instruction mnemonic (ex. PAY) and the '4-digit transaction code' to MNO's recharging gateway (via inventor).

CL SIM also stores the 4-digit transaction code in the transaction history file (EF) to display when subscriber views 'transaction history' thru' the handset's STK menu.

This transaction process initiated with a simple touch, can be extended to multiple applications initiated and authorized by a user presenting a high security 'contact less card' to a 'terminal device' with common security keys. Typically it requires transaction parameters such as application ID, customer ID, terminal ID, transaction code and amount, in encrypted to a remote gateway (bank server, service provider billing system or 3 rd party payment gateway) for authentication and validation.

e). Direct Debit to Account (DDA)

Subscribers who are registered with MNO for ECL (bank account or credit card) or alternatively, registered their mobile number at their respective bank's ATM can avail of this payment mode. A DDA mobile bill payment transaction for a subscriber with mobile no. registration at a bank's ATM is as follows:

Subscriber touches his/her handset to the 'mobile' icon on the AP for identification A welcome message with the relevant 'application' icons are displayed at the bottom of the screen.

Subscriber touches the 'mobile bill payment' icon on the screen

Authorizes the transaction by touching the handset to the 'mobile' icon on the AP AP passes a 'bill payment' command to the CL SIM which includes a random '4-digit transaction code' (alpha numeric).

CL SIM triggers the handset to send a structured SMS with instruction mnemonic (ex. BILL) and the '4-digit transaction code' the to the subscriber's bank's SMS Gateway.

CL SIM also stores the 4-digit transaction code in the transaction history file (EF), to display when subscriber views 'transaction history' thru' STK menu.

SMS content is processed and account status verified by Bank's server

Sends back a SMS to the handset requesting confirmation of 'transaction code' by the subscriber.

After receipt of the confirmation, the bank's server completes the settlement process with MNO's billing system, just like its done presently. 'Transaction Code' passed by the bank server to MNO's billing system Note: The AP will light up a green led and give a single beep as an audio-visual feedback to subscribers confirming successful transaction. Alternatively, a red led and an alarm beep will require the subscriber to repeat the transaction.

f). Value Addition (Optional)

Additional features can be enabled as a value-add options, if required by MNO but would require extra time, cost and support.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the description.

Finally, it will be understood that the scope of this invention as described and/or illustrated herein is not limited to the specified embodiments. Those of skill will appreciate that various modifications, additions, known equivalents, and substitutions are possible without departing from the scope and spirit of the invention as set forth in the following claims.

What is claimed is:

1. An integrated system for facilitating a mobile commerce transaction by a user, the system comprising:

a backend server coupled to a computer network;

a wireless handheld communication device having a near field communication (NFC) transceiver, a contactless Subscriber Identity Module (SIM), a contactless SIM controller coupled to the contactless SIM and an RF antenna coupled to the contactless SIM controller; a point of sale (POS) device including an NFC transceiver and having at least one of a touch sensitive input and at least one button, the POS device being in communicative connection with the backend server;

wherein the POS device is configured to: detect when the wireless handheld device is placed within an NFC-enabling range of the NFC transceiver, retrieve user identity information from the SIM, send the identifying information to the backend server and display a representation of available mobile commerce transaction information corresponding to the identified user;

wherein the backend server is operative to receive the identifying information and identify a corresponding user;

wherein the POS device is operative to: (a) accept a selection of a mobile commerce transaction chosen by the user either manually pressing a button or activating the touch sensitive input on the POS device and (b) detect when the wireless handheld device is again placed within an NFC-enabling range of the NFC transceiver subsequent to the user's selection of a mobile commerce transaction to confirm the user's selection;

wherein the POS device is further operative to provide, via the NFC transceiver, to the wireless handheld communication device, information identifying the selected mobile commerce transaction;

wherein the wireless handheld communication device is operative to transmit a transaction signal comprising said selected mobile commerce transaction identification information, and information identifying said wireless handheld communication device, to said backend server; and wherein the backend server is further operative to: receive the transaction signal identifying the user and the selected mobile commerce transaction, complete the selected mobile commerce transaction and send a confirmation message to the wireless handheld communication device, indicating completion of the selected mobile commerce transaction.

2. The system of claim 1, wherein the mobile commerce transaction is for the payment of services including one or more of: prepaid recharge, post-paid bill and hello tunes download.

3. The system of claim 1, wherein the completion of the transaction includes sending ring tones or other mobile content to the wireless handheld communication device.

4. A method of implementing a mobile commerce transaction for a user in a system comprising:
   a wireless handheld communication device having a near field communication (NFC) transceiver and comprising a contactless Subscriber Identity Module (SIM), a Contactless SIM controller coupled to the contactless SIM and an RF antenna coupled to the Contactless SIM controller, in communication with the wireless telecommunications network;
   a point of sale (POS) device comprising an NFC transceiver and a display and having at least one of a touch sensitive input and at least one button; and
   a backend server,
   wherein the method comprises:
      the user placing the wireless handheld communication device within an NFC detection range of the NFC transceiver of the POS device;
      the NFC transceiver on the POS device detecting the proximity of the wireless handheld device and retrieving client information from the contactless SIM;
      the POS device presenting one or more available mobile commerce transactions to the user in response to the NFC detection of the wireless handheld device and the retrieved client information;
      the user selecting an available mobile commerce transaction by at least one of pressing a button or engaging said touch sensitive input on the POS device;
      after selecting an available mobile commerce transaction, the user again placing the wireless handheld device within the NFC range of the NFC transceiver of the POS device to confirm the user's selection;
      the POS device providing, via said NFC transceiver, to the wireless handheld communication device, information identifying the selected mobile commerce transaction;
      the wireless handheld communication device transmitting a transaction signal comprising said selected mobile commerce transaction identification information, and information identifying said wireless handheld communication device, to said backend server;
      the backend server receiving the transaction signal from the wireless handheld communication device, identifying the user and the selected mobile commerce transaction from information obtained from the transaction signal, and completing the selected mobile commerce transaction.

5. The method of claim 4, further comprising establishing a secure connection between the wireless handheld communication device and the POS device through a radio frequency identification (RFID) transceiver.

6. The method of claim 4, wherein the mobile commerce transaction is for the payment of services including one or more of: prepaid recharge, post paid bill and hello tunes download.

7. The method of claim 4, wherein the Contactless SIM comprises a dual chip architecture comprising a SIM controller chip with flash memory and a Contactless Processor chip.

8. The method of claim 4, further comprising the user paying with cash or by Direct debit to a Credit Card account or a Bank account.

9. The method of claim 4, wherein the user placing the wireless handheld device within NFC-enabling range of the POS device comprises touching the POS device with the wireless handheld device.

10. The method of claim 4 wherein the wireless handheld communication device is operable on a single wireless telecommunications network maintained by a mobile network service provider and, further, said backend server comprises a backend server of said mobile network service provider.

11. The method of claim 4 wherein the step of completing the transaction further comprises:
   authorizing the commerce transaction;
   transmitting the authorization to said wireless handheld communication device via said wireless communication network;
   the POS device obtaining said authorization, via said NFC transceiver, for completion of the commerce transaction.

12. The method of claim 4 wherein the step of completing the transaction further comprises the backend server sending a confirmation message to the wireless handheld communication device indicating completion of the selected mobile commerce transaction.

13. The method of claim 4 wherein all communication between said backend server and said POS device occurs via said wireless handheld communication device.

14. A point of sale (POS) device comprising:
   a near field communication (NFC) transceiver;
   a display;
   at least one of: a touch sensitive input and at least one button;
   wherein the POS device is configured to:
      detect a first placement, by a user, of a wireless handheld device within a detection range of the NFC transceiver;
      retrieve user identity information from a memory associated with the wireless handheld device using NFC subsequent to the first detection;
      present a representation of one or more available mobile commerce transactions on the display corresponding to the retrieved user identity information;
      accept a selection of an available mobile commerce transaction chosen by the user either activating the at least one button or the touch sensitive input on the POS device;
      detect a second placement of the wireless handheld device within the detection range of the NFC transceiver after the user's selection of an available mobile commerce transaction to confirm the user's selection; and
      provide, via the NFC transceiver, the wireless handheld communication device with information related to the selected mobile commerce transaction upon detection of the second placement.

15. A method of implementing a mobile commerce transaction with a user in a system comprising a point of sale (POS) device having a near field communication (NFC) transceiver, a display and at least one of: a touch sensitive input and at least one button, the method comprising:
   detecting a first placement, by the user, of a user wireless handheld device within a detection range of the NFC transceiver;

retrieving user identity information from a SIM associated with the wireless handheld device using NFC subsequent to the first placement detection;

presenting a representation of one or more available mobile commerce transactions on the display corresponding to the retrieved user identity information;

accepting a selection of an available mobile commerce transaction chosen by the user either activating the at least one button or the touch sensitive input on the POS device;

detecting a second placement of the wireless handheld device within the detection range of the NFC transceiver after the user's selection of an available mobile commerce transaction to confirm the user's selection; and providing, via the NFC transceiver, said wireless handheld communication device with information related to the selected mobile commerce transaction upon detection of the second placement;

said wireless communication device transmitting a transaction signal comprising said selected mobile commerce transaction identification information, and information identifying said wireless handheld communication device, to said backend server; and said wireless communication device receiving, from the backend server, a confirmation message indicating successful completion of the selected mobile commerce transaction.

16. A method of implementing a mobile commerce transaction for a user in a system comprising:

a wireless handheld communication device having a near field communication (NFC) transceiver and comprising a contactless Subscriber Identity Module (SIM), a Contactless SIM controller coupled to the contactless SIM and an RF antenna coupled to the Contactless SIM controller, in communication with the wireless telecommunications network;

a point of sale (POS) device comprising an NFC transceiver and a display and having at least one of a touch sensitive input and at least one button; and a backend server, wherein the method comprises:

the user placing the wireless handheld communication device within an NFC detection range of the NFC transceiver of the POS device;

the NFC transceiver on the POS device detecting the proximity of the wireless handheld device and retrieving client information from the contactless SIM;

the POS device presenting one or more available mobile commerce transactions to the user in response to the NFC detection of the wireless handheld device and the retrieved client information;

the user selecting an available mobile commerce transaction by at least one of pressing a button or engaging said touch sensitive input on the POS device;

after selecting an available mobile commerce transaction, the user again placing the wireless handheld device within the NFC range of the NFC transceiver of the POS device to confirm the user's selection;

the POS device providing, via said NFC transceiver, to the wireless handheld communication device, information identifying the selected mobile commerce transaction;

the wireless handheld communication device transmitting a transaction signal comprising said selected mobile commerce transaction identification information, and information identifying said wireless handheld communication device, to a content server;

the backend server receiving a balance authorization inquiry from the said content server, identifying the user and the selected mobile commerce transaction from information obtained from said content server, and either authorizing or denying the selected transaction; and, if the selected transaction is authorized by the backend server, said handheld communication device receiving a download from said content server whereby the selected mobile commerce transaction is completed.

17. A method of implementing a mobile commerce transaction for a user in a system comprising:

a wireless handheld communication device having a near field communication (NFC) transceiver and comprising a contactless Subscriber Identity Module (SIM), a Contactless SIM controller coupled to the contactless SIM and an RF antenna coupled to the Contactless SIM controller, in communication with the wireless telecommunications network;

a point of sale (POS) device comprising an NFC transceiver and a display and having at least one of a touch sensitive input and at least one button; and a backend server, wherein the method comprises:

the user placing the wireless handheld communication device within an NFC detection range of the NFC transceiver of the POS device;

the NFC transceiver on the POS device detecting the proximity of the wireless handheld device and retrieving client information from the contactless SIM;

the POS device presenting one or more available mobile commerce transactions to the user in response to the NFC detection of the wireless handheld device and the retrieved client information;

the user selecting an available mobile commerce transaction by at least one of pressing a button or engaging said touch sensitive input on the POS device;

after selecting an available mobile commerce transaction, the user again placing the wireless handheld device within the NFC range of the NFC transceiver of the POS device to confirm the user's selection;

the POS device providing, via said NFC transceiver, to the wireless handheld communication device, information identifying the selected mobile commerce transaction and an alphanumeric transaction code;

the wireless handheld communication device transmitting a payment request to the user's bank; said payment request including a payment instruction and said transaction code;

receiving by said handheld communication device a transaction code confirmation request; and, upon confirmation of said transaction code, said backend server completing the settlement process for payment for the mobile commerce transaction through receipt of electronic funds from a payment entity.

* * * * *